July 19, 1955 R. C. PIERCE 2,713,484
TORSION SPRING AXLE MOUNTING
Filed Oct. 18, 1951
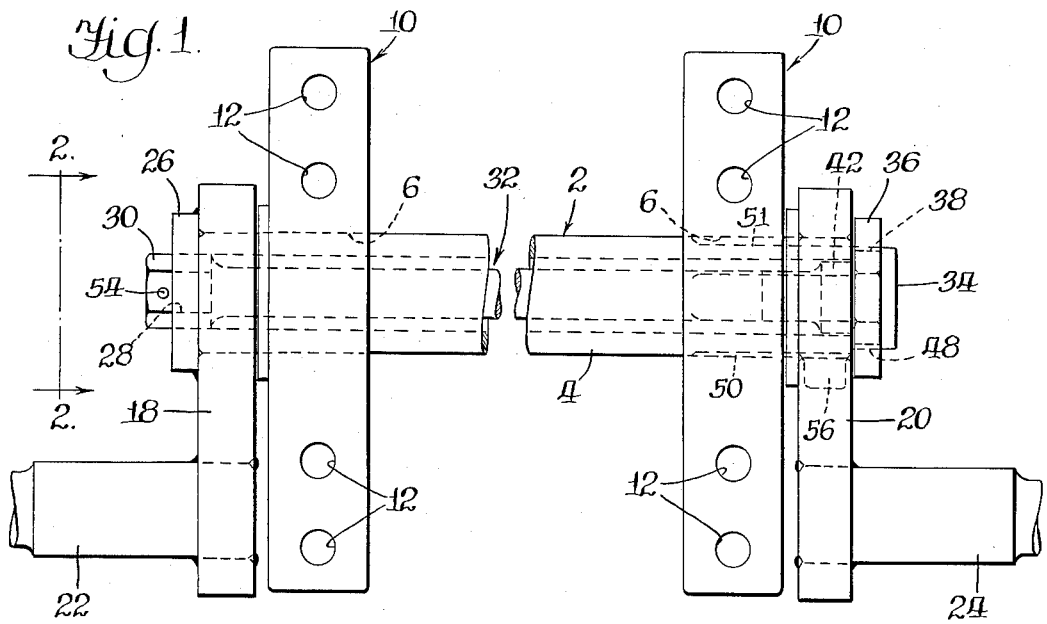
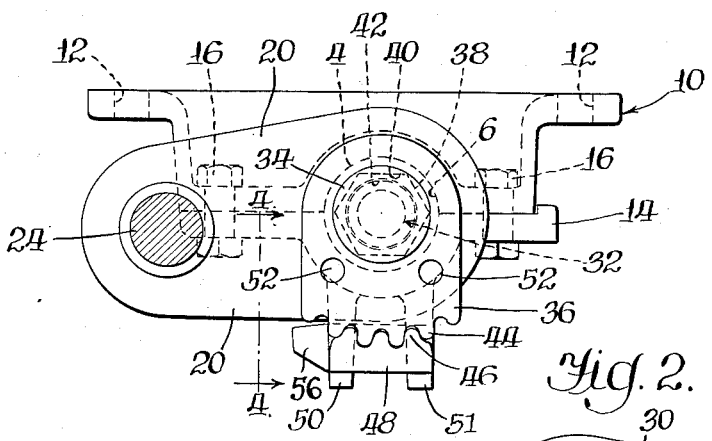
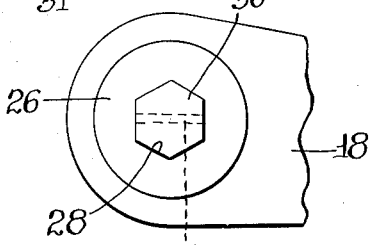
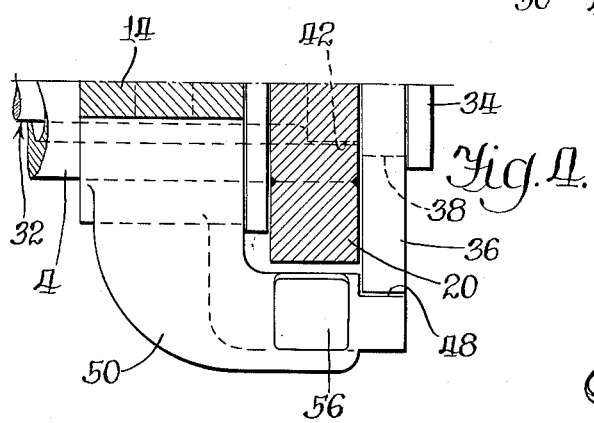
INVENTOR.
Raymond C. Pierce

# United States Patent Office 2,713,484
Patented July 19, 1955

2,713,484

TORSION SPRING AXLE MOUNTING

Raymond C. Pierce, Chicago, Ill.

Application October 18, 1951, Serial No. 251,889

6 Claims. (Cl. 267—57)

This invention relates to wheel and axle assemblies and more particularly to an assembly incorporating torsion spring means for supporting the load of a vehicle such as a trailer.

A primary object of the invention is to devise a wheel and axle assembly wherein the parts may be quickly assembled and disassembled to facilitate installation as well as repair of the device.

Another object of the invention is to protect the torsion spring against mechanical damage and corrosion by housing the spring within a hollow axle.

Still another object of the invention is to provide means for adjusting the torsion spring to accommodate pre-stressing thereof as well as possible set thereof in service.

A more specific object of the invention is to provide cranks on the ends of the axle for attachment to associated wheels and to provide a driving connection between one of the cranks and one end of the torsion spring, the opposite end of the spring being afforded a novel anchor with respect to the supported vehicle.

The foregoing and other objects and advantages of the invention will become apparent from a consideration of the following specification and the accompanying drawings, wherein:

Figure 1 is a fragmentary top plan view of a wheel and axle assembly embodying a preferred form of the invention;

Figure 2 is a fragmentary end elevational view taken on the line 2—2 of Figure 1;

Figure 3 is an end elevational view of the wheel and axle assembly taken from the right hand extremity thereof, as seen in Figure 1, and Figure 4 is a sectional view on the line 4—4 of Figure 3.

Describing the invention in detail, the wheel and axle assembly generally designated 2, comprises a hollow tube-like axle 4 rotatably mounted at each end thereof within a bearing 6 of a bracket 10, which is preferably provided with openings 12 for convenient attachment to the frame of a supported vehicle (not shown) such as a trailer. It will be understood that, if desired, the brackets 10 may be formed as integral parts of the vehicle frame.

The axle 4 is rotatably retained within the bearing 6 by caps 14 secured to the respective brackets 10, as by bolt and nut assemblies 16; and outboardly of the brackets 10, the axle 4 is secured as by welding or other convenient means to cranks 18 and 20 having spindles 22 and 24 respectively, for attachment in the usual manner to associated wheels (not shown) for supporting the vehicle.

The crank 18 comprises a driving plate 26 secured to the outboard surface thereof, as by welding, and the driving plate is provided with a non-round driving opening 28 therethrough. The opening 28 is illustrated as hexagonal in form, but may be square or triangular, or of any other desired non-round configuration to afford a driving connection between the crank 18 and a driven end 30 of a torsion bar spring 32. The end 30 of the spring 32 is complementarily formed to the opening 28 and is afforded a snug fit therein to substantially eliminate relative rotative movement between the crank 18 and spring portion 30 about the longitudinal axis of the spring. However, the fit between the spring end 30 and the opening 28 is slidable so that the end 30 may be inserted into the opening 28 and removed therefrom, as hereinafter described in connection with the assembly of the device.

The spring 32 extends through the axle 4, and the opposite end of the spring 32 is provided with a cap 34 engageable with the outboard side of a lever or anchor member 36 to maintain the latter in the assembled position illustrated in the drawings. The spring 32 inboardly of the cap 34 is provided with a non-round anchor portion 38 which is illustrated as hexagonal in form and which may be square or triangular or of any other desired non-round configuration. The portion 38 is afforded a snug slidable fit within a complementary opening 40 of the anchor member 36 to substantially eliminate relative rotative movement between the spring portion 38 and the anchor member 36 about the longitudinal axis of the spring 32. However, it may be noted that the portion 38 may be slidably inserted into the opening 40 or removed therefrom during assembly and disassembly of the device.

The spring 32 inboardly of the anchor portion 38 thereof is provided with a substantially cylindrical bearing portion 42 snugly fitted within the axle 4 and conforming approximately to the inner diameter thereof to accommodate rotational and axial movement of the spring 32 within the axle without any possibility of binding at the anchored end of the spring.

The anchor or lever member 36 is formed at the lower end thereof as a gear sector having a plurality of teeth 44 meshed with teeth 46 of an anchor sector 48 carried by spaced arms 50 and 51 depending from the cap 14 of the bracket 10 at the anchored end of the spring 32. The member 36 is also provided with wrench engaging means, such as a pair of openings 52 therethrough, for engagement with a spanner wrench to pre-stress the spring 32 or to adjust the same to accommodate set therein, as will be readily apparent to those skilled in the art.

The novel wheel and axle assembly is assembled by inserting the axle 4 into the bearings 6 and attaching the caps 14 to the brackets 10, whereupon the anchor member 36 is sleeved over the end 30 of the spring 32 and the opening 40 is fitted over the anchor portion 38 of the spring, with the member 36 in engagement with the cap 34. The spring 32 is then inserted into the axle 4 from the right hand thereof, as seen in Figure 1, and the spring 32 is moved to the left until the driving end 30 thereof is fitted in opening 28 and is approximately flush with the outboard face of the plate 26, thereby affording an interlock between the end 30 and the crank 18. A spanner wrench is then applied to the holes 52 of the anchor member 36 and any desired predetermined initial torsion is applied to the spring 32 which is then forced to the left engaging the teeth 44 of the anchor member 36 with the teeth 46 of the anchor sector 48. A cotter pin (not shown) is then applied through an opening 54 of the driving end 30 of the spring 32.

It will be understood by those skilled in the art that when the wheel and axle assembly 2 is applied to a vehicle, as above described, the load thereof or any irregularities of the road traversed by the wheels (not shown) on the spindles 24 causes upward rotational movement of the cranks 18 and 20 relative to the vehicle. This rotational movement is imparted to the driving end 30 of the torsion bar spring 32, the opposite end of which is anchored to the anchor member 36, which is in turn anchored to the vehicle frame, as above described, whereby upward rotational movement of the cranks 18 and 20 and the axle 4, to which they are attached, is spring resisted by torsional stressing of the spring bar 32.

The arm 50 is provided with a lug 56 engageable with the crank 20 to limit downward rotation thereof as for example when the novel axle assembly is removed from the vehicle during assembly or disassembly with respect thereto.

I claim:

1. An axle device comprising spaced brackets, a hollow axle journaled in said brackets, cranks on said axle having wheel attaching means outboardly of said brackets, a torsion bar spring extending through said axle and brackets, an anchor at one end of said spring outboardly of one of said cranks, the ends of said spring having non-round portions slidably fitted within complementary openings, respectively, of said anchor and the other crank for positively interlocking the spring against rotative movement relative thereto, said anchor having a gear sector struck from the longitudinal axis of said spring, teeth fixed to the related bracket and meshed with teeth of said sector to prevent relative rotative movement of the anchor and bracket on said axis, the non-round portion of said spring remote from said anchor having greater length axially of said spring than the interengaged areas of said teeth, whereby, upon assembly of said device, said non-round portion may be inserted into the related opening and said anchor member may then be rotated on said axis and moved axially with the spring to interengage the teeth of said anchor and bracket for pre-stressing or accommodating torsional set of said spring.

2. An axle assembly comprising spaced brackets, a tubular axle journaled in said brackets, cranks on said axle having wheel attaching means, a torsion spring bar extending through said axle, an anchor at one end of said spring, the ends of said spring having non-round portions slidably fitted within complementary openings of said anchor and one crank, respectively, said anchor having a gear sector including a plurality of teeth, other teeth fixed with respect to the related bracket and meshed with the teeth of said sector to prevent relative rotative movement of the anchor and bracket, the non-round portion of said spring remote from said anchor having greater length axially of said spring than the interengaged areas of said teeth whereby said non-round portion may be inserted in the related opening, and said anchor member may then be rotated and moved axially with the spring to interengage the teeth of the anchor and bracket for pre-stressing or accommodating torsional set of said spring.

3. An axle assembly comprising spaced brackets, an axle member having a crank with wheel attaching means, a torsion spring bar member, one of said members being telescoped within the other, the other of said members being journaled in said brackets, non-round portions at the ends of said spring member, one of said portions being slidably fitted within a complementary opening of the crank, an anchor having an opening complementary to the other portion and slidably fitted thereover, said anchor having a gear sector including a plurality of teeth, other teeth fixed with respect to the related bracket and meshed with the teeth of said sector to prevent relative rotative movement of the anchor and bracket, the non-round portion of said spring member fitted within the opening of said crank having greater length axially of said spring member than the interengaged areas of said teeth, whereby the last mentioned portion may be inserted into the related opening and then said anchor may be rotated and moved axially with the spring to interengage the teeth of the anchor and bracket for pre-stressing or accommodating torsional set of the spring member.

4. An axle assembly comprising spaced brackets, a hollow axle journaled therein, a crank on said axle having wheel attaching means, a torsion bar spring extending through said axle and brackets, an anchor member, said spring having non-round portions slidably fitted in complementary openings of the anchor member and crank, respectively, said anchor member having a driving sector including a plurality of teeth, other teeth fixed with respect to the related bracket and meshed with the teeth of said sector, and means for maintaining the spring in assembled relationship comprising a cap on one end of the spring engageable with the outboard surface of the anchor member, and a cotter opening through the non-round portion at the opposite end of the spring and disposed outboardly of the crank.

5. An axle assembly comprising spaced brackets, an axle member, a torsion spring member, one of the members being sleeved within the other and the other of said members being journaled in said brackets, a crank on the axle member having a driving connection to the spring member at one end thereof, the driving connection comprising a non-round opening in the crank member receiving a complementary non-round portion of said torsion spring member, and means for anchoring the opposite end of the spring member to the related bracket, the anchoring means comprising elements fixedly attached to the spring member and related bracket, respectively, said elements having interengaged gear teeth separable by relative motion between said elements a determined distance axially of the spring member, said non-round portion having greater length axially of the spring member than said determined distance.

6. An axle assembly for a vehicle comprising an axle member journaled to the vehicle, a spring member sleeved within said axle member and having a connection to the axle member on one end thereof, a crank connected to the axle member rotatable therewith about the longitudinal axis of said member and including wheel carrying means, adjustable means connecting said spring to the vehicle comprising an element having gear teeth connected to the spring, another element having gear teeth fixedly carried relative to the vehicle and engaging the first mentioned gear teeth, and means permitting the disengagement of said adjustable means while maintaining the connection between said members.

References Cited in the file of this patent

UNITED STATES PATENTS

| | | |
|---|---|---|
| 2,227,762 | Ronning | Jan. 7, 1941 |
| 2,333,650 | Hickman | Nov. 9, 1943 |
| 2,438,432 | Edwards | Mar. 23, 1948 |
| 2,480,934 | Julien | Sept. 6, 1949 |
| 2,558,311 | Morrow | June 26, 1951 |

FOREIGN PATENTS

| | | |
|---|---|---|
| 516,521 | France | Dec. 8, 1920 |
| 844,796 | France | May 1, 1939 |
| 622,994 | Germany | Dec. 11, 1935 |